(12) United States Patent
Tschernko et al.

(10) Patent No.: US 9,878,945 B2
(45) Date of Patent: Jan. 30, 2018

(54) METHOD FOR EXPANDING RAW MATERIAL IN THE FORM OF SAND GRAINS

(71) Applicant: Binder + Co AG, Gleisdorf (AT)

(72) Inventors: Harald Tschernko, Gleisdorf (AT); Marcus Alfred Pusch, Graz (AT); Bernhard Neukam, Stattegg (AT); Ernst Erwin Brunnmair, Graz (AT)

(73) Assignee: BINDER + CO AG, Gleisdorf (AT)

( * ) Notice: Subject to any disclaimer, the term of this patent is extended or adjusted under 35 U.S.C. 154(b) by 0 days.

(21) Appl. No.: 15/315,253

(22) PCT Filed: Jun. 5, 2015

(86) PCT No.: PCT/AT2015/050143
§ 371 (c)(1),
(2) Date: Nov. 30, 2016

(87) PCT Pub. No.: WO2015/184482
PCT Pub. Date: Dec. 10, 2015

(65) Prior Publication Data
US 2017/0107146 A1    Apr. 20, 2017

(30) Foreign Application Priority Data
Jun. 5, 2014 (AT) .............................. GM50089/2014

(51) Int. Cl.
*C04B 20/06* (2006.01)
(52) U.S. Cl.
CPC .......... *C04B 20/068* (2013.01); *C04B 20/066* (2013.01)
(58) Field of Classification Search
CPC ...... C04B 20/06; C04B 20/068; C04B 20/066
USPC ..................................................... 23/313 AS
See application file for complete search history.

(56) References Cited

U.S. PATENT DOCUMENTS

| 2,625,512 A | 1/1953 | Powell |
| 4,180,185 A | 12/1979 | Fujiki et al. |
| 2017/0107147 A1 | 4/2017 | Tschernko |

FOREIGN PATENT DOCUMENTS

| DE | 197 22 906 A1 | 12/1998 |
| WO | WO 2009/009817 A1 | 1/2009 |
| WO | WO 2013/053635 A1 | 4/2013 |
| WO | WO 2015/184481 | 12/2015 |
| WO | WO 2015/184482 | 12/2015 |

OTHER PUBLICATIONS

International Search Report issued in PCT/AT2015/050142, dated Sep. 11, 2015.
International Search Report issued in PCT/AT2015/050143, dated Sep. 24, 2015.

*Primary Examiner* — Edward Johnson
(74) *Attorney, Agent, or Firm* — Sean D. Detweiler, Esq.; Morse, Barnes-Brown & Pendleton, P.C.

(57) ABSTRACT

The invention relates to a method for the expansion of sand grain-shaped raw material (1) in which the raw material drops downwards through a substantially vertical heated shaft (3) provided with means (2) for heating, in which a shaft flow (4) prevails and to a dosing element (6) which can be connected to a substantially vertical shaft (3) and a conveying line (7).
In order to prevent the pressure fluctuations coming from the conveying line (7) in the area of the shaft (3), a dosing element (6) is attached between the shaft and the conveying (7) line, in which the quantity of granulate which goes over from the shaft (3) into the conveying line (7) is regulated via means for regulating so that a defined material collection of the granulate is formed as a buffer in the dosing element (6), which decouples the shaft flow (4) from the conveying flow.

16 Claims, 2 Drawing Sheets

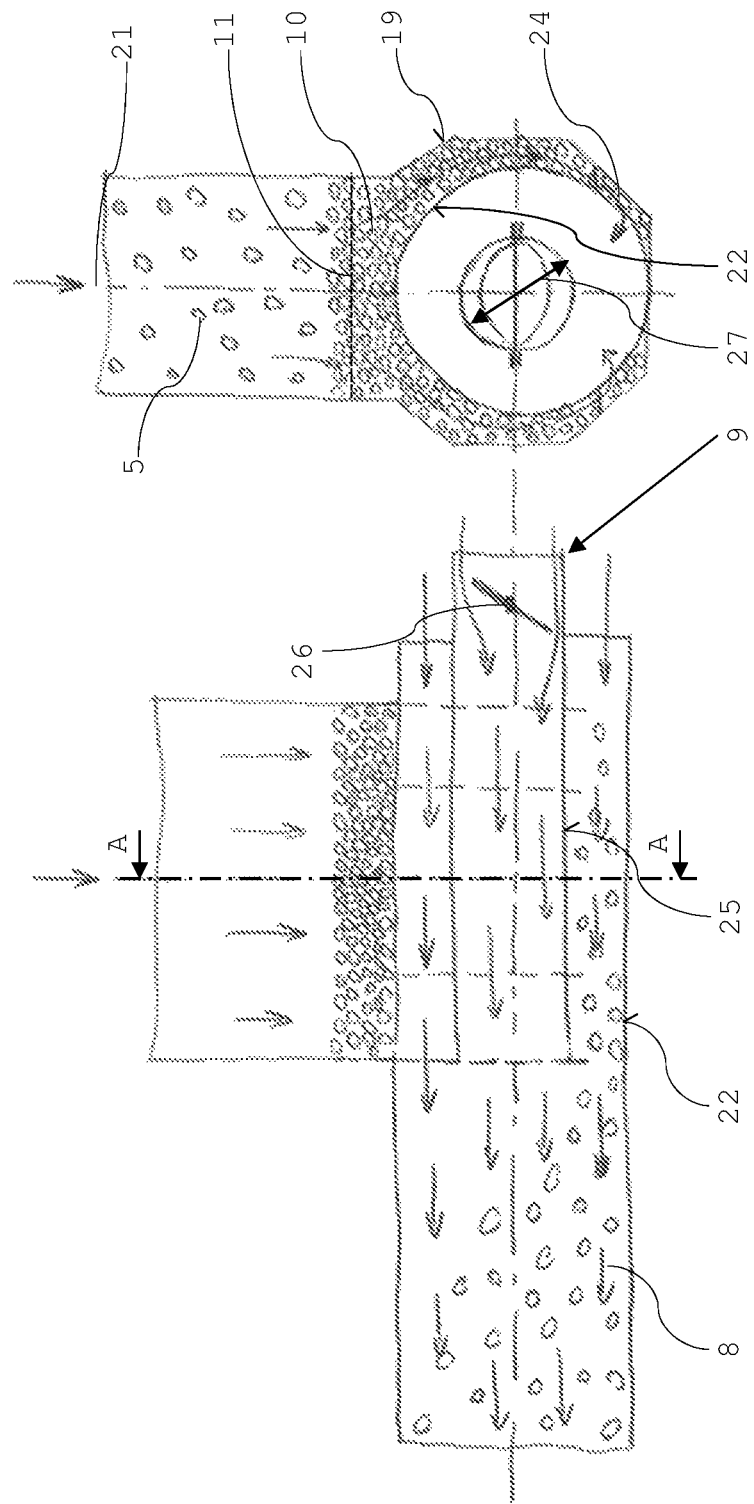

METHOD FOR EXPANDING RAW MATERIAL IN THE FORM OF SAND GRAINS

CROSS-REFERENCE TO RELATED APPLICATIONS

This application is a national stage filing under 35 U.S.C. 371 of International Application No. PCT/AT2015/050143, filed Jun. 5, 2016, which claims priority to Austrian Application No. GM 50089/2014, filed Jun. 5, 2014. The entire teachings of the above PCT Application No. PCT/AT2015/050143 are incorporated herein by reference.

FIELD OF THE INVENTION

The invention relates to a method for the expansion of sand grain-shaped raw material in which the raw material drops downwards through a substantially vertical heated shaft provided with means for heating, in which a shaft flow prevails and to a dosing element which can be connected to a substantially vertical shaft and a conveying line.

PRIOR ART

A method for producing an expanded granulate from sand grain-shaped raw material is disclosed in WO 2013/053635 A1, where the object consists in adjusting a closed surface of the expanded granulate in a controllable manner so that the expanded granulate exhibits no hygroscopicity or hardly any hygroscopicity. In addition, the possibility of specifically influencing the surface structure of the expanded granulate and therefore the roughness is to be provided. To this end, this document proposes providing a plurality of independently controllable heating elements arranged along the drop section of the sand grain-shaped raw material and performing a temperature detection along the drop section, wherein the heating elements are controlled depending on the detected temperature below the region in which the expansion process takes place. Removal of the expanded granulate from the lower end of the drop section is ensured by means of a pneumatic conveying line into which the drop section opens.

As a result of the vertical alignment of the shaft and as a result of the additional introduction or extraction of process gases accompanying the expansion process, flows occur inside the shaft which act on the sand grain-shaped raw material. In particular, the formation of a near-wall upwardly directed boundary layer flow has a positive effect on the quality of the expansion process since this boundary layer flow prevents any baking of the sand grain-shaped raw material on the wall of the shaft. If the expansion shaft is closed towards the top, in addition to the upwardly directed boundary layer flow, a central downwardly directed core flow is established. This core flow prevents some of the above-described boundary layer flow and therefore results in baked-on deposits. The influence of the core flow can be reduced by the hitherto-known extraction/in-blowing of process gas from/into the head region of the shaft.

As a result of the direct connection of the shaft to a pneumatic conveying line, however, pressure fluctuations are produced, possibly caused by the cleaning cycles of a filter in the conveying line which are passed on directly to the air in the shaft. As a result, transverse flows are produced in areas of the shaft, which impede the positive effect of the boundary layer flow and thus lead to baked-on deposits which cause a substantial deterioration in the quality of the expansion process and which can only be eliminated by complex maintenance measures when the process is at a standstill.

Therefore the non-uniform expansion processes and the formation or baked-on deposits on the shaft walls can be seen as disadvantages of the prior art which occur as a result of transverse flows caused, for example, by pressure fluctuations in the subsequent pneumatic conveying line. The known extraction/in-blowing of process gases from/into the head region of the shaft cannot prevent this effect.

DESCRIPTION OF THE INVENTION

The formulation of the object forming the basis of the present invention is to provide a method for producing an expanded granulate from sand grain-shaped raw material and a dosing element for connecting the shaft to the conveying line, which does not have the described disadvantages and ensures that the pressure fluctuations from the conveying line do not affect the quality of the expanded granulate. The method should ensure trouble-free and low-maintenance operation. The dosing element should be characterized by a simple and reliably design. Furthermore, it should be possible to retrofit the invention to existing systems without major expenditure.

This object is achieved by the method mentioned initially whereby a dosing element is attached between the shaft and the conveying line, in which the quantity of granulate which goes over from the shaft into the conveying line is regulated via means for regulating so that a defined material accumulation of the granulate is formed as a buffer in the dosing element, which decouples the shaft flow from the conveying flow.

The invention is based on the fact that as a result of an accumulation of material which can be formed by simple means, possibly by piling up the granulate which drops down, pressure conditions can be established in the region above the material accumulation which in normal operation are no longer influenced by the pressure fluctuations in the conveying line. It is self-evident that as a result of the formation of a material accumulation, no complete gastight sealing of the shaft with respect to the conveying line can be achieved but the sealing effect is sufficient to prevent a transfer of pressure fluctuations from the conveying flow to the shaft flow.

By attaching means for regulation, the height of the material accumulation can be specifically influenced and adjusted to the optimal value for the current process where lower limits must not be fallen below and upper limits must not be exceeded.

With regard to the sand grain-shaped raw material, not only mineral sands can be used in which water is bound as propellant such as, for example, pearlite or obsidian sand. This can also comprise mineral dust which is mixed with water-containing mineral binder where in this case the water-containing mineral binder acts as propellant. The expansion process can in this case proceed as follows: the mineral dust which consists of relatively small sand grains having a diameter of, for example, 20 pm, forms larger grains of, for example, 500 pm with the binder. At a critical temperature the surfaces of the sand grains of the mineral dust become plastic and form closed surfaces of the larger grains or melt to form such. Since the closed surface of an individual larger grain is usually overall smaller than the sum of all the surfaces of the individual sand grains of the mineral dust which are involved in the formation of this larger grain, in this way surface energy is obtained or the ratio of surface to volume decreases. At this moment, larger grains each having a closed surface are present where the grains comprise a matrix of mineral sand dust as well as water-containing mineral binder. Since the surface of these mineral grains as previously are plastic, the forming water vapour can subsequently expand the larger grains. That is, the water-containing mineral binder is used as propellant. Alternatively mineral dust can also be mixed with a propellant, where the propellant is blended with mineral binder which preferably contains water. $CaCO_3$ for example can be used as propellant. In this case, the expansion process can take place similarly to that described above: the mineral dust which has a relatively small sand grain size (for example, 20 pm diameter) forms larger grains (for example, 500 pm diameter) with the propellant and the mineral binder. Upon reaching a critical temperature, the surfaces of the sand grains of the mineral dust become plastic and form a closed surface of the larger grains or fuse to form such. The closed surfaces of the larger grains are plastic as previously and can now be expanded by the propellant. If the mineral binder is water-containing, this can function as additional propellant. Thus, in a preferred embodiment of the method according to the invention it is provided that the mineral material with propellant comprises a mineral material in which water is bound and acts as propellant or mineral dust mixed with water-containing mineral binder which acts as propellant or mineral dust mixed with a propellant which is blended with mineral binder, wherein the mineral binder preferably contains water and acts as additional propellant. In order to be able to carry out the method presented as efficiently as possible, in addition to a shaft furnace it is preferable to provide a plurality of heating zones with (independently of one another) controllable heating elements as well as an intelligent regulating and control unit. This controls the heating elements preferably as a function of measured temperatures along the furnace shaft.

The method according to the invention can for example be configured as in WO 2013/053635 A1. Its disclosure is therefore incorporated fully in this description.

A preferred embodiment is characterized in that the material accumulation which serves as a buffer is designed in such a manner that at least a first cross-section of the dosing element is filled completely with expanded granulate from the shaft over a defined height. This type of buffer is characterized in that it is particularly simple to produce. The expanded granulate dropping from the shaft is piled up until a certain height has been reached and the material accumulation thereby forming serves as a buffer. The height of the material accumulation can, for example, be defined by the location of a measuring device which is attached in the dosing element and detects the presence of a material accumulation. The location of the measuring device corresponds in the operating state of the dosing element to a certain height within the dosing element and thus also to a certain height of a material accumulation then present.

According to a further preferred embodiment, the conveying flow is produced by an extraction device. If the extraction system is attached in particular at the end facing away from the dosing element, a conveying flow is obtained over the entire length of the conveying line, where other elements such as, for example, filter systems can be attached in the conveying line.

In another preferred embodiment, a separating device, preferably a gas cyclone is provided in the conveying line by means of which the expanded granulate is separated from the conveying flow. Since the expanded granulate comprises the end product of the method, the concentrated removal from the conveying flow, in particular by a gas cyclone, is advantageous since in this way a container such as, for example, a silo can be filled in a simple manner for further transport or for further processing of the granulate.

A further preferred embodiment provides that the bulk density of the granulate is determined as a quality feature of the expansion process in order to subsequently regulate the means for heating or reduce the feeding of raw material. Through continuous control of the expanded granulate, such a procedure enables conclusions to be drawn on the conditions in the shaft. If the bulk density differs appreciably from the set standard parameters, this can on the one hand be down to a different composition of the sand grain-shaped raw material, which can be compensated by modification of the temperature in the means for heating or if can be down to baked on deposits on the inner sides of the shaft. If the latter case occurs, the feeding of raw material can be reduced, preferably stopped completely in order to be able to carry out maintenance work.

According to a further particularly preferred embodiment, the means for regulating increases or reduces the conveyed quantity of expanded granulate in the conveying line by means of a local influencing of the conveying flow in the dosing element. Such a regulation of the conveyed quantity can be achieved without moving parts which come in contact with the expanded granulate and is thus resistant to blockages. A reduction in the conveyed quantity leads to an increase in the material accumulation whereas the opposite case occurs when the conveyed quantity is increased.

In a further particularly preferred embodiment, the height of the material accumulation in the dosing element is detected and this information is transmitted to the means for regulating. As a result, the height of the material accumulation can be varied by the influence of the conveyed quantity or a non-uniform feeding of raw material can be compensated so that the height of the material accumulation remains approximately constant.

According to a further preferred embodiment, process air is extracted from the head region of the shaft in order to increase and thereby stabilize the part of the shaft flow directed to the head region. As a result of such a design, the positive effect of the lack of pressure fluctuations is combined with a reduction of the downwardly directed core flow with the result that the flow conditions in the shaft can be kept largely constant independently of external influences.

A further preferred embodiment of the invention provides that process air is blown in or sucked into the head region of the shaft in order to stabilize the part of the shaft flow directed to the head region. This provides another possibility for keeping the flow conditions in the shaft approximately constant and has a positive effect on the quality of the expanded granulate as a result of the simultaneous reduction of the pressure fluctuations coming from the conveying line.

The dosing element according to the invention is characterized in that it comprises a material container which can be connected to the shaft via a shaft connection and has a longitudinal axis, a conveying section which can be connected to the conveying line via a conveying connection and means for regulating which are configured so that a material accumulation is produced in the area of the material container when granulate enters into the material container. The dosing element can be connected to the shaft by the shaft connection so that expanded granulate enters into the material container. Via the conveying section the granulate reaches the conveying connection by means of which the dosing element can be connected to the conveying line in order to ensure the removal of the expanded granulate which has passed through the dosing element. The conveyed quantity which passes through the dosing element is influenced by the means for regulating in such a manner that a material accumulation forms in the material container since more granulate drops from the shaft into the material container than is removed from the dosing element via the conveying connection. If the material accumulation has reached a certain defined height, the quantity conveyed through the dosing element will approximately correspond to the quantity of granulate which drops from the shaft into the material container.

A system according to the invention can be configured so that the substantially vertically heatable shaft is connected via the shaft connection to the material container of the dosing element in which means for regulating the conveyed quantity are located and that the conveying section of the dosing element is connected to the pneumatic conveying line via the conveying connection.

The initially formulated object can thus be solved both by a dosing element according to the invention alone and also by a system according to the invention containing the dosing element. Thus, the invention also relates to a system for carrying out a method according to the invention with a dosing element which is connected to a substantially vertical heatable shaft and a pneumatic conveying line, wherein it is provided according to the invention that the dosing element comprises a material container which is connected to the shaft via a shaft connection and which has a longitudinal axis, a conveying section which is connected to the conveying line via a conveying connection, and means for regulating which are configured so that a material accumulation is produced in the area of the material container when granulate enters into the material container.

According to a preferred embodiment of the dosing element according to the invention or a system according to the invention, the conveying section is guided through the material container transversely to the longitudinal axis of the shaft. This type of connection of conveying section and material container is characterized in that no complex construction is required. The material container can, for example, be welded together from sheet metal plates and must only be dimensioned so that its dimensions are greater than the diameter of the conveying section.

In a further preferred embodiment of the dosing element according to the invention or a system according to the invention, the conveying section can be connected to the ambient atmosphere on the side opposite the conveying connection with the result that the extraction system can extract ambient air to produce the conveying flow and transport it through the conveying line.

According to a further particularly preferred embodiment of the dosing element according to the invention or a system according to the invention, on the side opposite the shaft connection, the conveying section has at least one opening to ensure transfer of expanded granulate into the conveying section. Such a design ensures that the granulate only enters into the conveying section by means of the suction effect of the conveying flow and that the granulate covers the longest possible path before it reaches the at least one opening.

A further particularly preferred embodiment of the dosing element according to the invention or a system according to the invention provides that a measuring device is attached in the area of the material container by means of which the height of the material accumulation can be detected and which is coupled to the means for regulating the conveyed quantity. As a result, the conveyed quantity can be increased or reduced according to the height of the material accumulation via the means for regulating. If the height fails below a minimum height, the conveyed quantity is throttled and if a maximum height is exceeded, the conveyed quantity is increased.

According to a further particularly preferred embodiment of a dosing element according to the invention or a system according to the invention, the means for regulating the conveyed quantity is designed as an inner tube which is disposed inside the conveying section with a butterfly valve located therein. As a result of this simple design of the means for regulating, it is possible to regulate the conveyed quantity by adjusting the valve. The inner tube is preferably the same length as the conveying section and in the operating state is connected to the atmosphere on the same side as the conveying section so that ambient air can also be sucked in through the inner tube. In addition, it is advantageous to attach the inner tube concentrically to the conveying section in order to achieve a uniform suction effect.

In a further particularly preferred embodiment of a dosing element according to the invention or a system according to the invention, the butterfly valve is configured so that it can be closed on the one hand and thereby reduces the cross-section of the inner tube through which flow takes place when an exceeding of a defined height of the material accumulation is detected by the measuring device in order to increase the conveyed quantity and thus reduce the height of the material accumulation and on the other hand can be opened and thus increases the cross-section of the inner tube through which flow takes place when a falling below a defined height of the material accumulation is detected by the measuring device in order to reduce the conveyed quantity and thus increase the height of the material accumulation. Since the butterfly valve has the same diameter as the inner tube, a cross-section through which flow takes place can be adjusted. If the butterfly valve is normal to the longitudinal axis of the inner tube, there is no cross-section through which flow takes place and a strong suction is produced in the area between the inner tube and the inner face of the conveying section, with the result that more expanded granulate is sucked in from the material container. If the butterfly valve is parallel to the longitudinal axis of the inner tube, the same suction effect prevails over the entire cross-section of the conveying section and only a little granulate enters into the conveying section.

BRIEF DESCRIPTION OF THE FIGURES

A detailed description of a method according to the invention and a device according to the invention now follows. In the figures:

FIG. 2 shows a detailed view of a dosing element according to the invention, FIG. 3 shows a sectional view of a dosing element according to the invention along line AA in FIG. 2.

WAYS FOR IMPLEMENTING THE INVENTION

Figure 1:
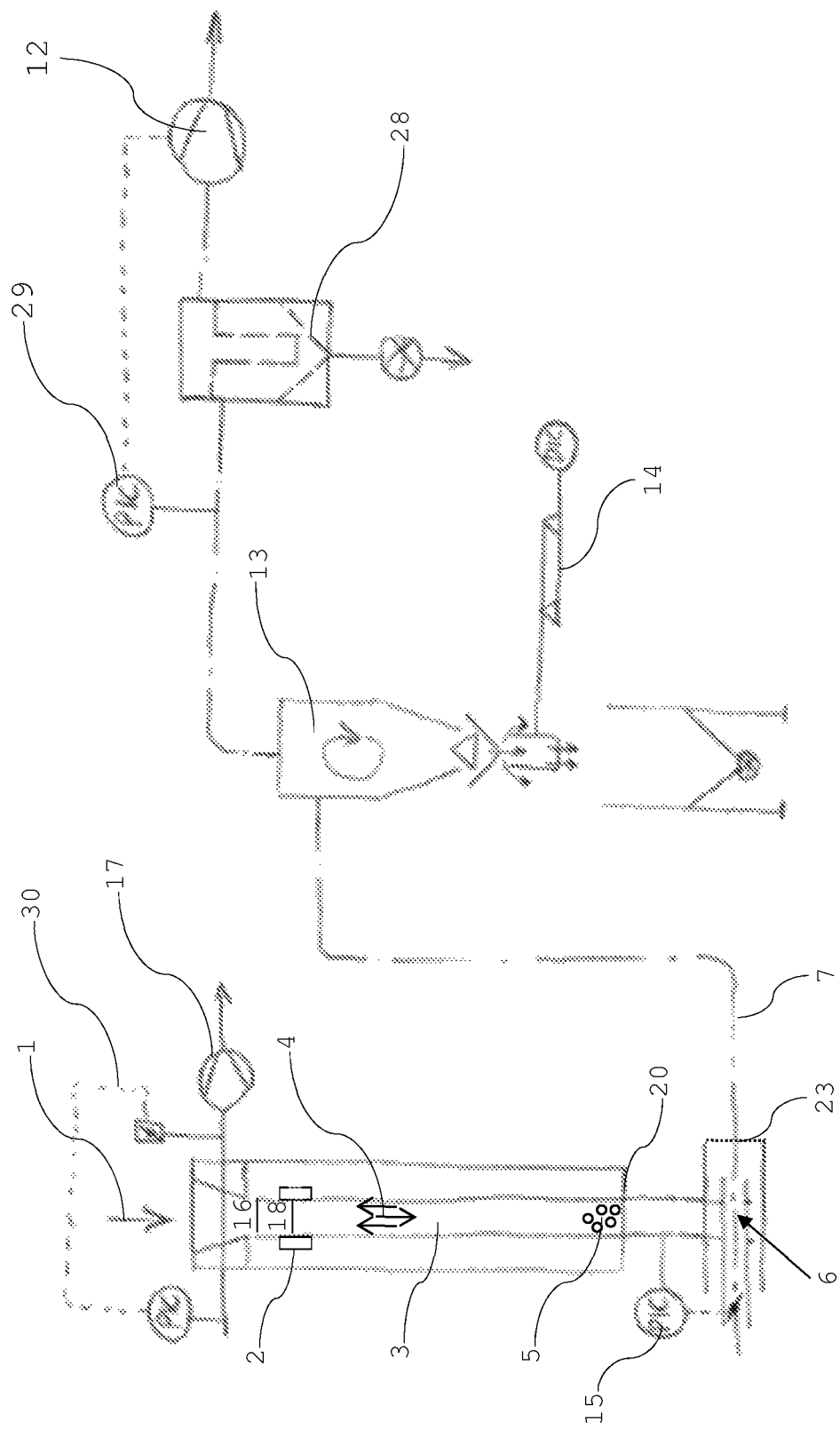
FIG. 1 shows a schematic image of a system according to the invention.

FIG. 1 shows a system for expansion of sand grain-shaped raw material 1. In this case, the raw material 1 falls through a vertical shaft 3 which can be heated by means 2 for heating, in the present embodiment a plurality of electrical resistance heaters 2 are used. The raw material is fed in the head region 16 of the shaft 3. Since the resistance heaters 2 can be controlled individually, a specific temperature profile can be established along the shaft 3. As a result of the thermal radiation which acts on the raw material 1 from the shaft 3, the raw material 1 expands to form expanded granulate 5. Due to the heated walls of the shaft 3 and the ensuing process air 18, a shaft flow 4 is established in the shaft 3, which consists of a near-wall boundary layer flow in the direction of the head region 16 and a central core flow in the direction of the shaft connection 20.

An additional extraction device 17 is provided in the head region 16 of the shaft 3, which extracts process air 18 from the head region 16 and thus improves the shaft flow 4. In addition, a control loop 30 is coupled to the additional extraction device 17 which regulates the fraction of extracted process air 18 and sucked-in ambient air. Likewise, process air 18 can be blown into the head region 16 to stabilize the shaft flow 4 either by this additional extraction device 17 or by another device not shown here.

Located at the lower end of the shaft 3 is a dosing element 6 which regulates the quantity of granulate 5 conveyed from the shaft 3 into the pneumatic conveying line 7. The dosing element 6 has a shaft connection 20 at the connecting point to the shaft 3 and a conveying connection 23 at the connection point to the conveying line 7. Likewise a measuring device 15 is mounted in the part of the dosing element 6 adjoining the shaft 3, the measurement data of which is used to regulate the conveyed quantity.

An extract ion device 12, which is preferably designed as a fan, is mounted at one end of the pneumatic conveying line 7 which sucks ambient air from the other end of the conveying line 7, which is designed to be open to the atmosphere and thus conveys expanded granulate 5. A gas cyclone 13 is located inside this conveying line 7 via which granulate 5 is separated from the conveying line. Located in the conveying line 7 is a filter system 28 which is preferably disposed between gas cyclone 13 and extraction device 12 which separates small particles from the conveying line 7. By measuring the differential pressure by means of an additional measuring device 29, the conveyed quantity of the extraction device 12 is controlled so that the flow velocity in the conveying line 7 remains constant even when the filter system 28 is contaminated.

FIG. 1 shows that in this embodiment a weighing device 14 is additionally provided, this being arranged downstream of the gas cyclone 13 in relation to the flow of granulate 5 and can be used to determine the weight and therefore the bulk density of the separated expanded granulate 5. By means of this measurement, the quality of the expansion process can be assessed and accordingly the feeding of raw material 1 is either reduced, preferably stopped entirely or the output of the resistance heaters 2 is increased in a specific region of the shaft 3. Alternative embodiments of the invention do not provide a weighing device 14 so that the expanded granulate 5 is introduced directly from the gas cyclone 13 into a container, preferably a silo.

FIGS. 2 and 3 now show a detailed view of the dosing element 6. FIG. 3 shows one of the main functions of the dosing element 6: the formation of a material accumulation 10. Expanded granulate 5 falls from the shaft 3 via the shaft connection 20 (FIG. 1) into a first part of the dosing element, the material container 19 which has a longitudinal axis 21. Since the quantity of granulate 5 from the shaft in a first process step is higher than the quantity of granulate 5 which enters into the conveying line through the dosing element 6, the material container 19 is filled with expanded granulate 5 so that a material accumulation 10 is formed which fills at least a first cross-section 11 of the material container 19. By this means the space located above the material accumulation 10 in the operating state, in particular the shaft 3, can be decoupled in terms of pressure technology from the space located downstream of the material container 19 in the operating state, in particular the conveying line 7, so that the pressure fluctuations in the conveying line 7 do not affect the shaft flow 4. The material container 19 is designed so that it has at least the same cross-section as the shaft 3 in the area of the shaft connection 20, preferably the entire upper area of the material container 19 has the same cross-section as the shaft 3, which in particular is rectangular.

FIG. 2 shows that a conveying section 22, which preferably has a circular cross-section is guided through the lower region of the material container 19, which preferably has a larger cross-section than the shaft 3, wherein the largest diameter of the conveying section 22 is configured to be smaller than the smallest dimension of the interior of the material container 19. The distance between the outer side of the conveying section 22 and the inner sides of the material container 19 is a multiple of the largest diameter to be expected of a granule of the expanded granulate 5 known from process-related empirical values. Usually the multiplication factor lies in a range between 10 times and 100 times, preferably between 20 times and 40 times. Typical granule diameters of the expanded granulate 5 lie in the range of 0.5 to 5 mm. For example, for a granule diameter of 2 mm and a factor of 30, a distance of 2 mm×30, i.e. 60 mm is obtained.

The material container 19 therefore encloses at least a part of the conveying section 22, preferably the entire conveying section 22. The conveying section 22 therefore preferably touches the base surface of the material container 19 and rests on this. The conveying section is guided transversely to the longitudinal axis 21 of the material container through this wherein in this variant of the inventions the longitudinal axis 21 intersects the axis of the conveying section 22 at a point and the angle between the axes is 90°. Alternative embodiments of the invention can also have different angles and offset axes. In order to ensure the transition of expanded granulate 5 from the material container 19 into the conveying section, at least one opening 24 (FIG. 3) is provided in the conveying section 22. This at least one opening 24 is located in this variant of the invention on the side of the conveying section 22 opposite the shaft connection 20 (and specifically on both sides of the conveying section 22, here symmetrically to the longitudinal axis 21), i.e. in the operating state on the lower side wherein the at least one opening 24 is preferably designed as a multiplicity of slits. Alternative embodiments provide that the at least one opening 24 has the shape of a rectangle, square or circle. In any case, the at least one opening 24 must be dimensioned so that the granules having the largest diameter which are known from process-related empirical values can still pass through the at least one opening 24 without a blockage forming. Preferably the ratio between the granules and the diameter of the opening 24 lies between 1:3 and 1:100, particularly preferably between 1:5 and 1:50, in particular between 1:5 and 1:25. For example, for a granule diameter of 2 mm and a ratio of 1:5, the diameter of the opening 24 with 2 mm×5 is obtained as 10 mm.

Located in the inside of the conveying section 22 is a means 9 for regulating the conveyed quantity which in this variant is designed as an inner tube 25 with a butterfly valve 26. In this case, the largest diameter of the inner tube 25 which like the conveying section 22 is preferably circular, is smaller than the smallest diameter of the conveying section 22 and these two elements are arranged concentrically. By varying the cross-section and the position of the inner tube 25, many alternative designs are feasible. The inner tube 25 is also, like the conveying section 22 and therefore the conveying line 7, connected to the atmosphere on the side opposite the conveying connection 23 whereby ambient air can be sucked through all the aforesaid elements.

The butterfly valve 26 is disposed inside the inner tube 25 and is preferably configured as a circular plate having a diameter which allows the closure of the inner tube 25. This butterfly valve 26 is rotatably mounted so that it is pivotable about an axis normal to the axis of the inner tube 25. This pivoting can take place in a region between a first position in which the butterfly valve 26 is parallel to the longitudinal axis of the conveying section 22 and a second position in which the butterfly valve 26 is normal to the longitudinal axis of the conveying section 22.

The same conveying flow 8 as in the conveying line 7 which is produced by the extraction device 12 (FIG. 1) prevails in the conveying section 22. By means of this conveying flow 8 granulate 5 is conveyed from the material container 19 via the at least one opening 24 into the conveying section 22 and further into the conveying line 7.

If the measuring device 15 (FIG. 1), which monitors the height of the material accumulation 10 in the upper part of the material container 19 in the operating state, detects that the height of the material accumulation 10 is too low, the butterfly valve 26 is opened, i.e. pivoted in the direction of the first position of the butterfly valve 26. As a result, the cross-section 27 through which flow takes place when the second position is reached is the same size as the diameter of the inner tube 25 and the same flow velocity of the conveying flow 8 prevails in the entire cross-section of the conveying section 22. As a result little granulate 5 is transferred from the material container 19 into the conveying section 22 and the height of the material accumulation 10 increases.

If the measuring device 15 (FIG. 1) now detects that the height of the material accumulation 10 is too high, the butterfly valve 26 is closed, i.e. pivoted in the direction of the second position of the butterfly valve 26. As a result, the cross-section 27 through which flow takes place when the first position is reached is minimal, preferably completely closed so that the flow velocity in the annular region between the inner tube 25 and the inside of the conveying section 22 becomes higher, with the result that a strong suction is produced and a large quantity of granulate 5 is transferred from the material container 19 into the conveying section and the height of the material accumulation 10 sinks.

This ensures that the height of the material accumulation 10 can always be held within a defined range in order to maintain the effect of decoupling of the shaft flow 4 from the conveying flow 5.

In this case, the minimum height of the material accumulation 10 is determined by the at least one opening 24 which must be covered with said minimum height. The actual height of the material accumulation 10 which is established during operation is determined by means of the distance of the measuring device 15 from the conveying section 22 which is preferably 1 cm to 15 cm. The measuring device 15 (or its detector) should therefore at best be attached only slightly higher than the outside diameter of the annular gap through which air flows (between the inner tube 25 and the inside of the conveying section 22) for sucking in the expanded granulate 5.

REFERENCE LIST

1 Sand grain-shaped raw material
2 Means for heating (electrical resistance heaters)
3 Shaft
4 Shaft flow
5 Expanded granulate
6 Dosing element
7 Pneumatic conveying line
8 Conveying flow
9 Means for regulating
10 Material accumulation
11 First cross-section
13 Gas cyclone (separating device)
14 Weighing device
15 Measuring device
16 Head region
17 Additional extraction device
18 Process air
19 Material container
20 Shaft connection
21 Longitudinal axis
22 Conveying section
23 Conveying connection
24 Opening
25 inner tube
26 Butterfly valve
27 Cross-section through which flow takes place
28 Filter system
29 Additional measuring device
30 Control loop

The invention claimed is:
1. Method for the expansion of sand grain-shaped raw material (1) in which the raw material (1) drops downwards through a substantially vertical heated shaft (3) provided with means (2) for heating, in which a shaft flow (4) prevails wherein as a result of the heat transfer in the shaft (3) the raw material (1) expands to expanded granulate (5) and the granulate (5) produced enters into a pneumatic conveying line (7) with a conveying flow (8) for further transport, characterized in that a dosing element (6) is attached between the shaft (3) and the conveying line (7), in which the quantity of granulate (5) which goes over from the shaft (3) into the conveying line (7) is regulated via means (9) for regulating so that a defined material accumulation (10) of the granulate (5) is formed as a buffer in the dosing element (6), which decouples the shaft flow (4) from the conveying flow (8).

2. The method according to claim 1, characterized in that the material accumulation (10) which serves as a buffer is designed in such a manner that at least a first cross-section (11) of the dosing element (6) is filled completely with expanded granulate (5) from the shaft (3) over a defined height.

3. The method according to claim 1, characterized in that the conveying flow (8) is produced by an extraction device (12).

4. The method according to claim 1, characterized in that a separating device, preferably a gas cyclone (13) is provided in the conveying line (7) by means of which the expanded granulate (5) is separated from the conveying flow (8).

5. The method according to claim 3, characterized in that the bulk density of the granulate (5) is determined as a quality feature of the expansion process in order to subsequently regulate the means for heating (2) or reduce the feeding of raw material (1).

6. The method according to any one of claims 1 to 4, characterized in that the means (9) for regulating increases or reduces the conveyed quantity of expanded granulate (5)

in the conveying line (7) by means of a local influencing of the conveying flow (8) in the dosing element (6).

7. The method according to claim 1, characterized in that the height of the material accumulation (10) in the dosing element (6) is detected and this information is transmitted to the means (9) for regulating.

8. The method according to claim 1, characterized in that process air (18) is extracted from the head region (16) of the shaft (3) in order to increase and thereby stabilize the part of the shaft flow (4) directed to the head region (16).

9. The method according to claim 1, characterized in that process air (18) is blown in or sucked into the head region (16) of the shaft (3) in order to stabilize the part of the shaft flow (4) directed to the head region (16).

10. System for performing a method according to claim 1 with a dosing element (6) which is connected to a substantially vertical heatable shaft (3) and a pneumatic conveying line (7), characterized in that the dosing element (6) comprises a material container (19) which is connected to the shaft (3) via a shaft connection (20) and has a longitudinal axis (21), a conveying section (22) which is connected to the conveying line (7) via a conveying connection (23) and means (9) for regulating which are configured so that a material accumulation (10) is produced in the area of the material container (19) when granulate (5) enters into the material container (19).

11. The system according to claim 10, characterized in that the conveying section (22) is guided through the material container (19) transversely to the longitudinal axis (21) of the shaft (3).

12. The system according to claim 10, characterized in that the conveying section (22) can be connected to the ambient atmosphere on the side opposite the conveying connection (23).

13. The system according to claim 10, characterized in that on the side opposite the shaft connection (20), the conveying section (22) has at least one opening (24) to ensure transfer of expanded granulate (5) into the conveying section (22).

14. The system according to claim 10, characterized in that a measuring device (15) is attached in the area of the material container (19) by means of which the height of the material accumulation (10) can be detected and which is coupled to the means (9) for regulating the conveyed quantity.

15. The system according to claim 1, characterized in that the means (9) for regulating the conveyed quantity is designed as an inner tube (25) which is disposed inside the conveying section (22) with a butterfly valve (26) located therein.

16. The system according to claim 15, characterized in that the butterfly valve (26) is configured so that it can be closed on the one hand and thereby reduces the cross-section (27) of the inner tube (25) through which flow takes place when an exceeding of a defined height of the material accumulation (10) is detected by the measuring device (15) in order to increase the conveyed quantity and thus reduce the height of the material accumulation (10) and on the other hand can be opened and thus increases the cross-section (27) of the inner tube (25) through which flow takes place when a falling below a defined height of the material accumulation (10) is detected by the measuring device (15) in order to reduce the conveyed quantity and thus increase the height of the material accumulation (10).

* * * * *